United States Patent
Lee et al.

(10) Patent No.: US 7,293,534 B2
(45) Date of Patent: Nov. 13, 2007

(54) PREMIXED CHARGE COMPRESSION IGNITION ENGINE AND RECIPROCATING GENERATOR HAVING THE SAME

(76) Inventors: Chan-Jae Lee, 803 Rose Green Town, 535-7 Sinweol 4-Dong, Yangcheon-Gu, Seoul 158-094 (KR); Jeong-Woo Lee, 803 Rose Green Town, 535-7 Sinweol 4-Dong, Yangcheon-Gu, Seoul 158-094 (KR); Sang-Hyeon Lee, 803 Rose Green Town, 535-7 Sinweol 4-Dong, Yangcheon-Gu, Seoul 158-094 (KR)

( * ) Notice: Subject to any disclaimer, the term of this patent is extended or adjusted under 35 U.S.C. 154(b) by 146 days.

(21) Appl. No.: 10/550,809

(22) PCT Filed: Mar. 23, 2004

(86) PCT No.: PCT/KR2004/000633

§ 371 (c)(1), (2), (4) Date: Sep. 23, 2005

(87) PCT Pub. No.: WO2004/090302

PCT Pub. Date: Oct. 21, 2004

(65) Prior Publication Data

US 2006/0185643 A1    Aug. 24, 2006

(30) Foreign Application Priority Data

Apr. 11, 2003  (KR) ...................... 10-2003-0022892
Oct. 9, 2003    (KR) ...................... 10-2003-0070335

(51) Int. Cl.
*F02B 47/02*  (2006.01)
*F02B 75/32*  (2006.01)

(52) U.S. Cl. .............................. 123/25 C; 123/51 AA; 123/197.3

(58) Field of Classification Search .............. 123/46 E, 123/25 C, 51 AA, 51 BA, 197.1, 197.3
See application file for complete search history.

(56) References Cited

U.S. PATENT DOCUMENTS 4,480,599 A * 11/1984 Allais ........................ 123/51 R
4,824,149 A *  4/1989 Reuchlein ................... 290/1 R (Continued)

FOREIGN PATENT DOCUMENTS

JP              62-155762           7/1987

(Continued)

*Primary Examiner*—Noah P. Kamen
(74) *Attorney, Agent, or Firm*—IPLA P.A.; James E. Bame (57) ABSTRACT

The object of the present invention is to provide a premixed charge compression ignition (PCCI) engine. The PCCI engine has a fuel injector (22) in a suction manifold (8) to prepare a premixed charge of fuel and air and induces a natural ignition of the premixed charge in a combustion chamber (20) of a high temperature and high pressure. The PCCI engine further includes a structurally improved connecting rod which has a spring operated in organic conjunction with the other elements of the PCCI engine. The present invention further provides a PCCI reciprocating generator that is fabricated by a combination of a reciprocating generator unit with the PCCI engine, so that the PCCI reciprocating generator operates with improved operational efficiency. In the present invention, two PCCI engines may be arranged to symmetrically face each other, thus providing a multiple PCCI engine.

11 Claims, 8 Drawing Sheets

U.S. PATENT DOCUMENTS

| | | | | |
|---|---|---|---|---|
| 5,237,964 | A | * | 8/1993 | Tomoiu .................... 123/25 C |
| 5,718,194 | A | * | 2/1998 | Binion .................... 123/25 C |
| 5,875,743 | A | * | 3/1999 | Dickey .................... 123/25 C |
| 6,234,120 | B1 | * | 5/2001 | Karlsson ................ 123/51 BA |
| 6,467,373 | B1 | * | 10/2002 | El Tahry et al. .......... 123/48 B |
| 2002/0073940 | A1 | * | 6/2002 | Simescu et al. .......... 123/25 C |
| 2002/0185109 | A1 | * | 12/2002 | Flynn et al. ................ 123/435 |

FOREIGN PATENT DOCUMENTS

JP            06-229319       8/1994

* cited by examiner

PREMIXED CHARGE COMPRESSION IGNITION ENGINE AND RECIPROCATING GENERATOR HAVING THE SAME

TECHNICAL FIELD

The present invention relates, in general, to premixed charge compression ignition (PCCI) engines and, more particularly, to a PCCI engine that has a fuel injector in a suction manifold to provide a premixed charge of fuel and air and induces a natural ignition of the premixed charge in a combustion chamber of a high temperature and high pressure without using a separate electric igniter, and that has a structurally improved connecting rod having a spring operated in organic conjunction with the other elements of the PCCI engine. The present invention further relates to a PCCI reciprocating generator that is fabricated by a combination of a reciprocating generator unit with the PCCI engine, and thus, the generator operates with improved operational efficiency.

BACKGROUND ART

Generally, in conventional gasoline engines, fuel is premixed with air to prepare a premixed charge which is, thereafter, electrically ignited in a combustion chamber to generate desired power. When the premixed charge of fuel and air is compressed at a higher compression ratio during a compression stroke, the temperature of the premixed charge increases to a level higher than a natural ignition point of the premixed charge. Thus, the premixed charge in the gasoline engines is early, naturally and repeatedly ignited at several points before a piston reaches the upper dead point in the combustion chamber, so that the premixed charge is almost instantaneously ignited until the piston reaches the upper dead point. The early natural ignition of the premixed charge in the gasoline engines undesirably generates noise caused by an engine knocking, reduces engine performance, and further causes damage to the engine. Therefore, to overcome the above-mentioned problems, the conventional gasoline engines must limit the maximum level of the compression ratio which is a value resulting from dividing the volume of the combustion chamber at the lower dead point by the volume of the combustion chamber at the upper dead point. That is, the conventional gasoline engines must limit the height of the upper dead point in a cylinder.

Different from the conventional gasoline engines, Diesel engines compress only air during a compression stroke and, thereafter, inject fuel to the compressed air, thus inducing a natural ignition of the fuel. Because only the air is compressed during the compression stroke, the Diesel engines do not induce any natural ignition of the fuel during the compression stroke. Thus, the Diesel engines can be designed to operate at a higher compression ratio of 12-24 which is considerably higher than that of the gasoline engines. The conventional Diesel engines inject the fuel into the combustion chamber by a fuel injector, and the injected fuel is continuously ignited for a long period from a time the piston moves from the upper dead point. However, because the fuel in the combustion chamber of the conventional Diesel engines is in contact with the compressed air for a short period, different from the conventional gasoline engines, the Diesel engines are problematic in that the fuel cannot be sufficiently mixed with the compressed air.

In an effort to overcome the problems of both the conventional gasoline engines and the conventional Diesel engines, a premixed charge compression ignition engine (PCCI engine) has been proposed and used. The PCCI engine results from a combination of the advantages of both the gasoline engines and the Diesel engines, thus inducing a lean burn of fuel, improving a fuel mileage and increasing an engine output power.

The PCCI engine premixes fuel with air to provide a premixed charge, and induces a natural ignition of the premixed charge to generate power. Several types of conventional PCCI engines have been proposed. Examples of the conventional PCCI engines will be described herein below, with reference to FIGS. 1, 2 and 3 (use of the reference numerals shown in FIGS. 1, 2 and 3 is limited to the embodiments shown in the drawings).

Figure 1:
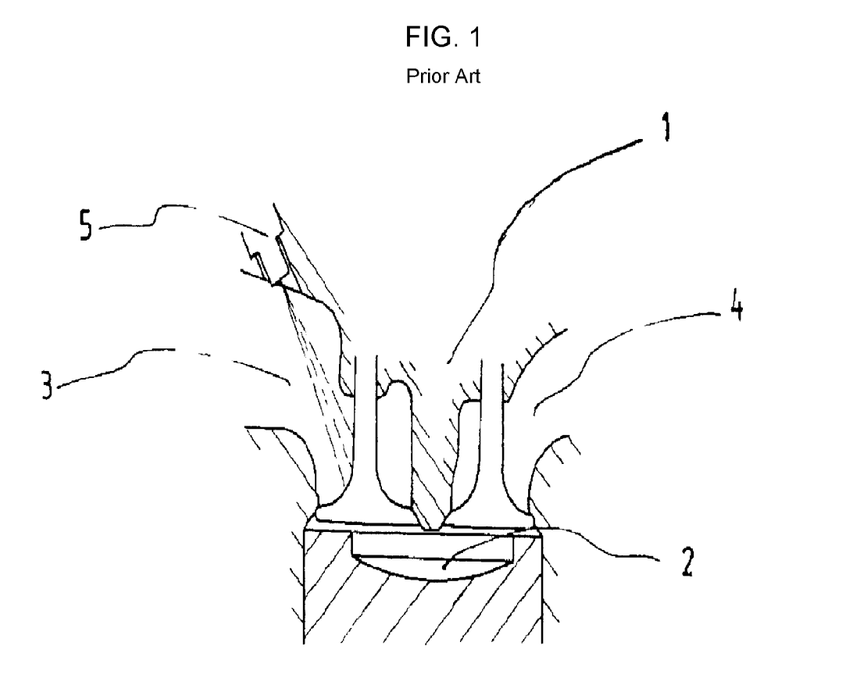
FIGS. 1 and 2 are views showing a conventional PCCI engine disclosed in Korean Patent Application No. 1996-063089.
Figure 2:
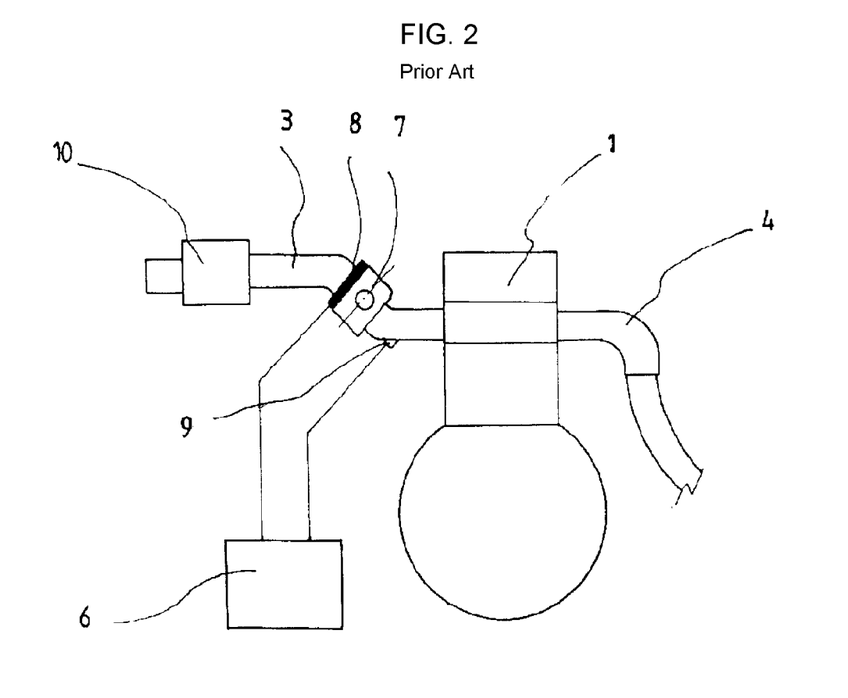
Figure 3:
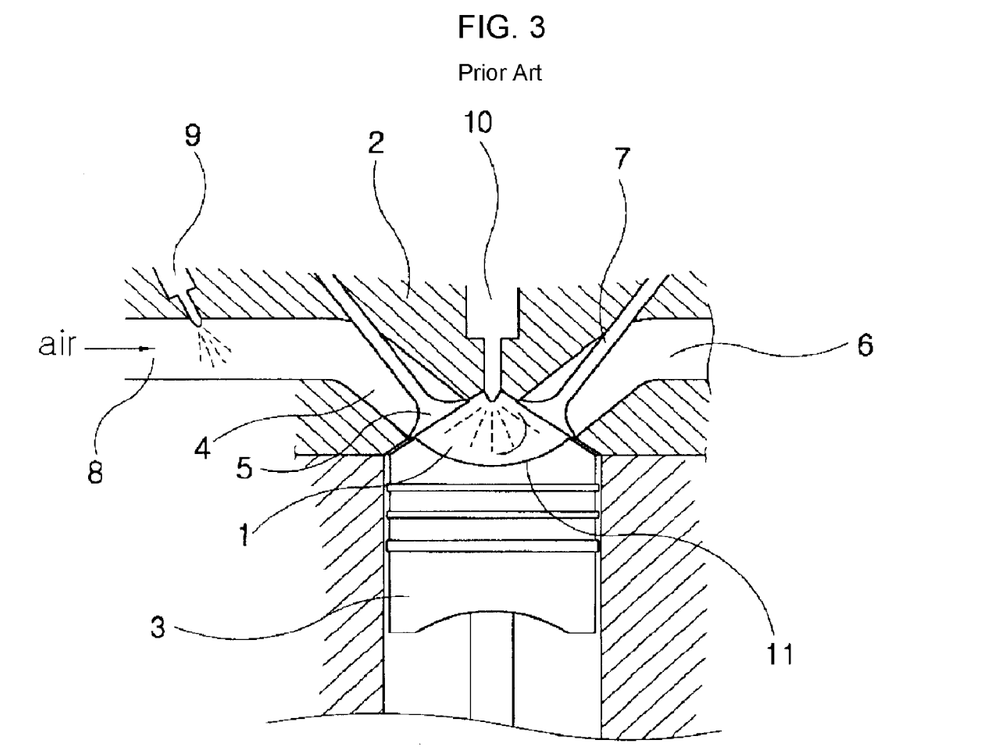
FIG. 3 is a sectional view showing a conventional gasoline PCCI engine disclosed in Korean Patent Application No. 1999-0067615.

FIGS. 1 and 2 show a conventional PCCI engine disclosed in Korean Patent Application No. 1996-063089. As shown in FIGS. 1 and 2, the conventional PCCI engine comprises a cylinder head 1 provided with both a suction manifold 3 and an exhaust manifold 4. An air cleaner 10 is provided at an inlet of the suction manifold 3.

The PCCI engine further includes a throttle body 7, a heater 8, and a temperature sensor 9. The throttle body 7 is installed at an intermediate position of the suction manifold 3 to control an amount of inlet combustion air. The heater 8 is provided on the suction manifold 3 at a position in front of the throttle body 7. The temperature sensor 9 is provided on the suction manifold 3 at a position in back of the throttle body 7. Both the heater 8 and the temperature sensor 9 respectively have electric circuits that are connected to an engine control unit 6 via electric wires.

The PCCI engine having the above-mentioned construction executes an adiabatic compression of a premixed charge of fuel and air at a high temperature and high pressure, and ignites the compressed premixed charge to burn the premixed charge. In the conventional PCCI engine, both the ignition quality and the lean burn air/fuel ratio vary according to a temperature of the inlet combustion air drawn into a combustion chamber 2. In a detailed description, the ignition quality is improved and the lean burn air/fuel ratio increases in proportion to an increase in the temperature of the inlet combustion air. In FIGS. 1 and 2, the reference numeral 5 denotes a fuel injector.

FIG. 3 shows a conventional gasoline PCCI engine disclosed in Korean Patent Application No. 1999-0067615. As shown in FIG. 3, the gasoline PCCI engine comprises a combustion chamber 1 which is defined between a cylinder head 2 and a piston 3. Both a suction port 4 and an exhaust port 6 are provided at the upper end of the combustion chamber 1. The suction port 4 guides inlet air from a suction manifold 8 into the combustion chamber 1, while the exhaust port 6 discharges exhaust gases from the combustion chamber 1 to an outside of the engine.

The suction port 4 is provided with a suction valve 5 to control the suction port 4, thus drawing a premixed charge of fuel and air into the combustion chamber 1. The exhaust port 6 is provided with an exhaust valve 5 to control the exhaust port 6, thus discharging the combustion gases from the combustion chamber 1 to the outside of the engine after a combustion of the premixed charge.

In the conventional gasoline PCCI engine, a first injector 9 is installed in the suction manifold 8 to inject a predetermined amount of gasoline to the inlet air that flows through the suction manifold 8. Thus, the gasoline is premixed with the inlet air in the suction manifold 8, so that an ultra-lean premixed charge of gasoline and air is prepared in the suction manifold 8. When the fuel, which is the gasoline, is injected into the inlet air in the suction manifold 8, the fuel flows to the suction port 4 in a state of being premixed with the inlet air prior to being drawn into the combustion chamber 1. Therefore, the fuel is homogeneously mixed with the air to provide a homogeneous premixed charge.

The gasoline PCCI engine further includes a second injector 10 of the direct injection type which is installed at the upper end of the combustion chamber 1 to inject a predetermined amount of fuel into the combustion chamber 1 at a last stage of an exhaust stroke. In the above state, the fuel is directly injected from the second injector 10 to a flow depression 11 that is formed on an upper end of the piston 3. Thus, the fuel flows in the combustion chamber 1 while tumbling, so that the fuel is homogeneously mixed with the air.

The above-mentioned conventional techniques which propose the PCCI engines, disclose only the basic constructions of the conventional PCCI engines, but do not describe any detailed techniques to increase the compression ratio, to increase the height of the upper dead point or to prevent the natural ignition of fuel before the piston reaches the upper dead point. Particularly, the conventional gasoline PCCI engine of FIG. 3 has the second igniter, so that there is no practical difference in the construction or operation effect between the gasoline PCCI engine and the conventional Diesel engines.

DISCLOSURE OF INVENTION

Technical-Solution

Accordingly, the present invention has been made keeping in mind the above problems occurring in the prior art, and an object of the present invention is to provide a PCCI engine that injects a cooling fluid to a hot premixed charge of fuel and air from a cooling nozzle during a compression stroke of a piston, thus reducing the temperature of the premixed charge in a combustion chamber to retard the natural ignition of the premixed charge, thus accomplishing a higher compression ratio of about 30.

Another object of the present invention is to provide a structurally improved connecting rod which has a spring and is used in the PCCI engine having the cooling nozzle, so that a thrust force, which is applied to the piston just before the piston reaches the upper dead point, is stored as a restoring force in the spring, and the restoring force of the spring is, thereafter, applied to the connecting rod just after the piston passes the upper dead point, thus reducing energy loss of the PCCI engine.

A further object of the present invention is to provide a multiple PCCI engine in which two PCCI engines are arranged to symmetrically face each other, thus minimizing vibration during reciprocating motions of two pistons of the two PCCI engines and reducing heat loss by a reduction in the heat transfer area of the engine.

Yet another object of the present invention is to provide a PCCI reciprocating generator which is fabricated by a combination of a reciprocating generator unit with the PCCI engine, and in which a crankshaft is installed in back of the generator unit, in place of a conventional position of the crankshaft between the generator unit and a piston, thus reducing energy loss at an intermediate position between the reciprocating generator unit and the piston.

In an aspect, the present invention provides a PCCI engine to compress a premixed charge of fuel and air at a high temperature and a high pressure, and thus, induce a natural ignition of the premixed charge, the PCCI engine comprising: a suction port provided with a suction valve; an exhaust port provided with an exhaust valve; a suction manifold placed to communicate with the suction port, and provided with an injector, thus homogeneously mixing the fuel with the air therein to provide the premixed charge; a cooling nozzle provided at an upper end in a combustion chamber of a cylinder; a fluid feed pump to feed a cooling fluid to the cooling nozzle at a high pressure; and a storage tank to store the cooling fluid therein, wherein the cooling nozzle injects the cooling fluid into the combustion chamber at a high pressure during a compression stroke of a piston in the cylinder, thus providing a high compression ratio to induce the natural ignition of the premixed charge.

The PCCI engine may further comprise a connecting rod which comprises: a first connecting rod part coupled at both ends thereof to the piston and a first support plate, respectively; a second connecting rod part coupled at both ends thereof to a crankshaft and a second support plate, respectively; and a plurality of springs to support and couple the first and second support plates to each other.

The PCCI engine may further comprise an electric igniter which is provided at an upper portion of the combustion chamber.

In another aspect, the present invention provides a PCCI reciprocating generator which is fabricated by a combination of a reciprocating generator unit with the PCCI engine to generate electricity.

In the PCCI reciprocating generator, the reciprocating generator unit may be coupled at a first end thereof to a first connecting rod part which is coupled to the piston, and at a second end thereof to a second connecting rod part which is coupled to a crankshaft, so that work of the piston is transmitted to the reciprocating generator unit without being reduced by the crankshaft.

In the PCCI reciprocating generator, in place of the direct coupling of the reciprocating generator unit to the second connecting rod part, the reciprocating generator unit may be coupled to a first support plate, and the second connecting rod part may be coupled to a second support plate, with a plurality of springs which support and couple the first and second support plates to each other.

The PCCI reciprocating generator may further comprise an electric igniter provided at an upper portion of the combustion chamber.

In a further aspect, the present invention provides a PCCI engine to compress a premixed charge of fuel and air at a high temperature and a high pressure, and thus, induce a natural ignition of the premixed charge, the PCCI engine comprising: a combustion chamber provided at a sidewall thereof with both a suction port having a suction valve and an exhaust port having an exhaust valve; a suction manifold coupled to the suction port and having an injector therein; and first and second pistons respectively arranged in lower and upper parts in the combustion chamber to face each other, so that the first and second pistons reciprocate in opposite directions based on the combustion chamber.

The PCCI engine may further comprise: a cooling nozzle provided on the sidewall of the combustion chamber; a fluid feed pump to feed a cooling fluid to the cooling nozzle at a high pressure; a storage tank to store the cooling fluid therein; a temperature sensor to sense a temperature of the combustion chamber; and a controller to control the engine so that the cooling nozzle injects the cooling fluid into the combustion chamber when the temperature of the combustion chamber sensed by the temperature sensor is not lower than a predetermined reference point.

The PCCI engine may further comprise: first and second crankshafts respectively coupled to the first and second pistons through a mechanical manner; first and second pulleys respectively coupled to the first and second crankshafts; and a belt wrapped around the first and second pulleys to allow the first and second pistons to reciprocate in the opposite directions based on the combustion chamber.

The PCCI engine may further comprise: a first connecting rod part coupled at both ends thereof to the first piston and a first support plate, respectively; a second connecting rod part coupled at both ends thereof to the first crankshaft and a second support plate, respectively; a plurality of first springs to support and couple the first and second support plates to each other; a third connecting rod part coupled at both ends thereof to the second piston and a third support plate, respectively; a fourth connecting rod part coupled at both ends thereof to the second crankshaft and a fourth support plate, respectively; and a plurality of second springs to support and couple the third and fourth support plates to each other.

In a further aspect, the present invention provides a PCCI reciprocating generator having a PCCI engine structure to compress a premixed charge of fuel and air at a high temperature and a high pressure, and thus, induce a natural ignition of the premixed charge, the PCCI reciprocating generator comprising: a combustion chamber provided at a sidewall thereof with both a suction port having a suction valve and an exhaust port having an exhaust valve; a suction manifold coupled to the suction port and having an injector therein; first and second pistons respectively arranged in lower and upper parts in the combustion chamber to face each other, so that the first and second pistons reciprocate in opposite directions based on the combustion chamber; and first and second reciprocating generator units to generate electricity using reciprocating forces of the first and second pistons, respectively.

The PCCI reciprocating generator may further comprise: a cooling nozzle provided on the sidewall of the combustion chamber; a fluid feed pump to feed a cooling fluid to the cooling nozzle at a high pressure; a storage tank to store the cooling fluid therein; a temperature sensor to sense a temperature of the combustion chamber; and a controller to control the generator so that the cooling nozzle injects the cooling fluid into the combustion chamber when the temperature of the combustion chamber sensed by the temperature sensor is not lower than a predetermined reference point.

The PCCI reciprocating generator may further comprise: first and second crankshafts respectively coupled to the first and second pistons through a mechanical manner; first and second pulleys respectively coupled to the first and second crankshafts; and a belt wrapped around the first and second pulleys to allow the first and second pistons to reciprocate in the opposite directions based on the combustion chamber.

In the PCCI reciprocating generator, the first reciprocating generator unit may be coupled at a first end thereof to a first connecting rod part which is coupled to the first piston, and at a second end thereof to a second connecting rod part which is coupled to the first crankshaft, and the second reciprocating generator unit may be coupled at a first end thereof to a third connecting rod part which is coupled to the second piston, and at a second end thereof to a fourth connecting rod part which is coupled to the second crankshaft.

The PCCI reciprocating generator may further comprise: a first support plate coupled to the second end of the first reciprocating generator unit; a second support plate coupled to the second connecting rod part; a plurality of first springs to support and couple the first and second support plates to each other; a third support plate coupled to the second end of the second reciprocating generator unit; a fourth support plate coupled to the fourth connecting rod part; and a plurality of second springs to support and couple the third and fourth support plates to each other.

DESCRIPTION OF DRAWINGS

The above and other objects, features and other advantages of the present invention will be more clearly understood from the following detailed description taken in conjunction with the accompanying drawings, in which.

BEST MODE

Reference should now be made to the drawings, in which the same reference numerals are used throughout the different drawings to designate the same or similar components.

Figure 4:
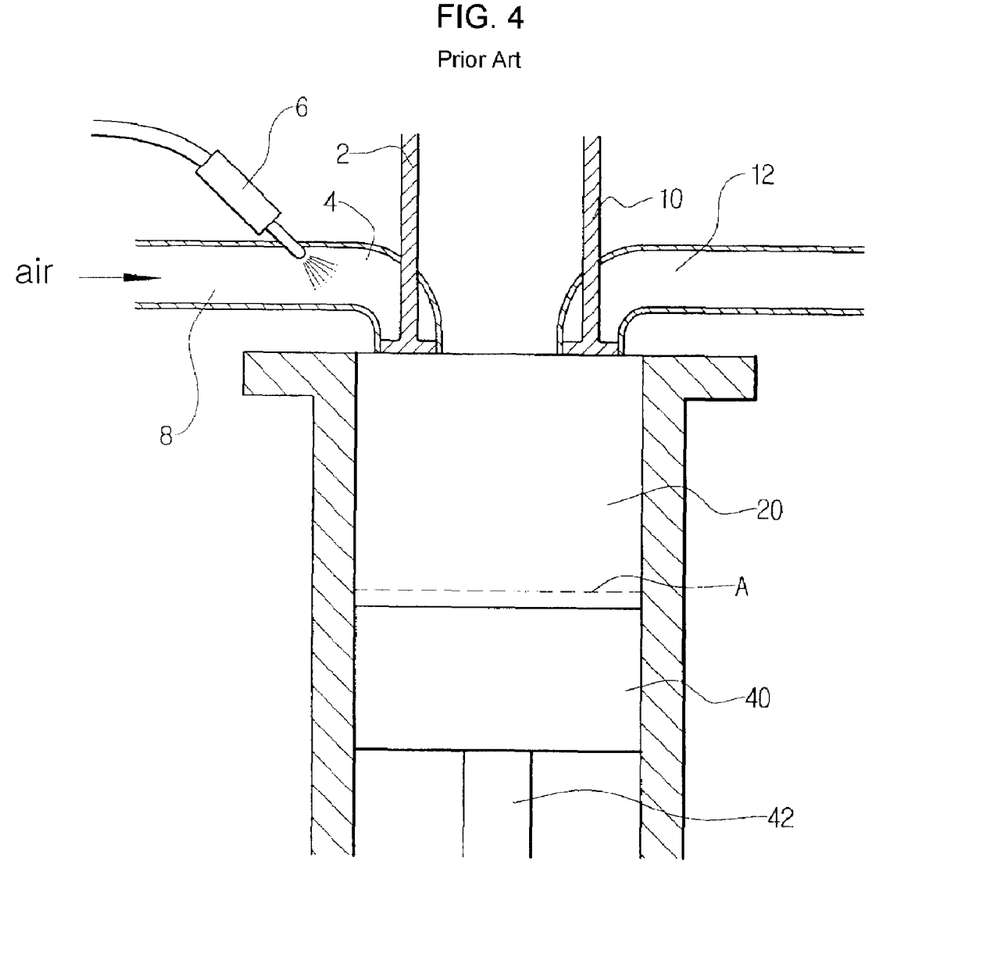
FIG. 4 is a sectional view showing an operation of a conventional PCCI engine.

FIG. 4 is a sectional view showing an operation of a conventional PCCI engine.

As shown in FIG. 4, during the operation of the conventional PCCI engine, inlet air is drawn into the engine through a suction manifold 8. In the suction manifold 8, the inlet air is mixed with high pressure fuel injected from an injector 6. The mixing of the fuel with the air in the suction manifold 8 before the fuel is introduced into a combustion chamber 20 is so-called a 'premixing' in the related art, and the premixed fuel and air in the above state is so-called a 'premixed charge'. The premixed charge is introduced into the combustion chamber 20 when the suction port 2 is opened.

In the combustion chamber 20, the premixed charge is highly heated and highly compressed, thus having a high temperature and high pressure. When a piston 40 reaches an upper dead point A of the cylinder, a natural ignition of the premixed charge is induced. In the conventional PCCI engine, the intervals of strokes of the piston 40 increase as the height of the upper dead point becomes higher and the height of the lower dead pint becomes lower. In other words, the intervals of strokes in the conventional PCCI engine increase in proportion to a compression ratio.

The conventional PCCI engine executes an explosion stroke after the compression stroke, and thus, the piston 40 moves downward. In the above state, an exhaust valve 10 is opened so that combustion gases are discharged from the combustion chamber 20 to an outside of the engine through an exhaust port 12.

When the piston 40 in the conventional PCCI engine completely reaches the upper dead point A, the temperature of the premixed charge increases higher than a natural ignition point of the premixed charge. Thus, a natural ignition of the premixed charge is induced in the combustion chamber, so that it is impossible to move the piston over the upper dead point A.

In FIG. 4, the reference numeral 42 denotes a connecting rod.

Figure 5:
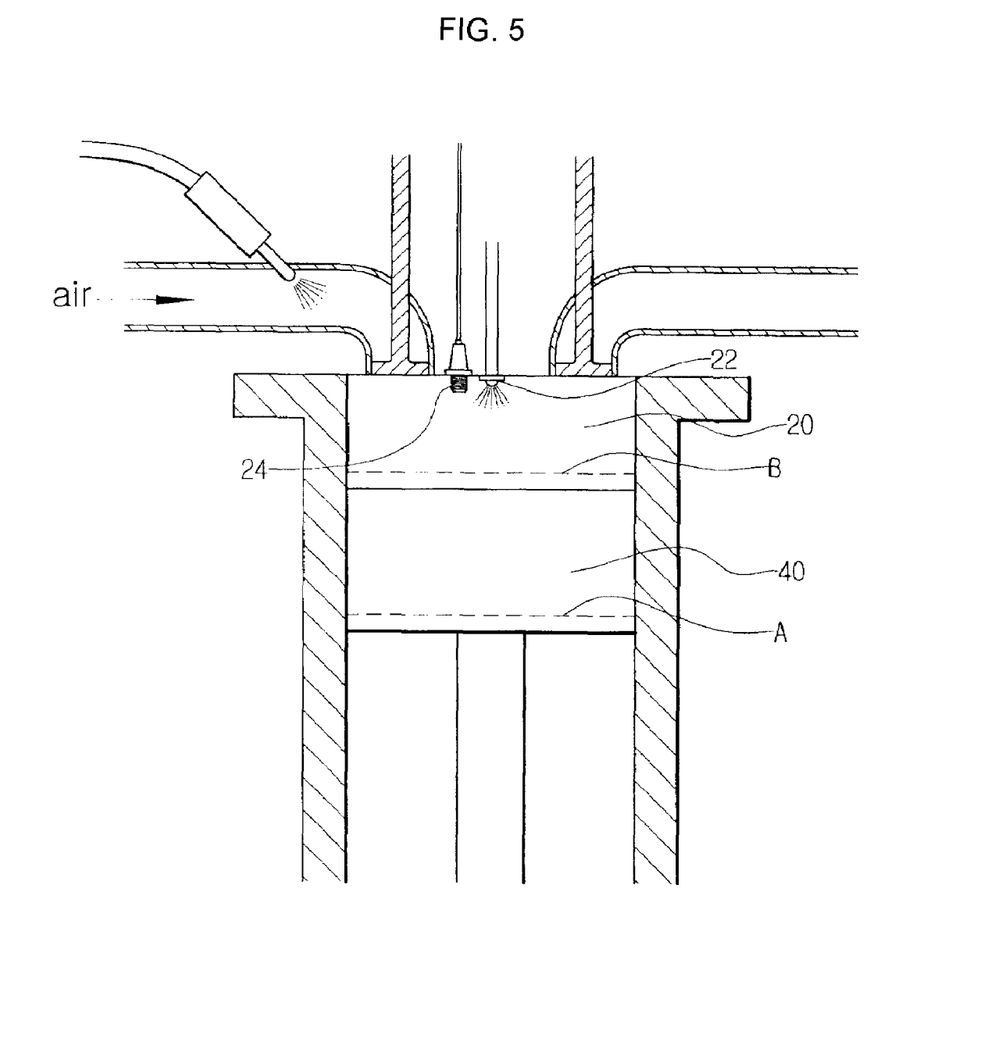
FIG. 5 is a sectional view showing an operation of a PCCI engine having a cooling nozzle, according to an embodiment of the present invention.

FIG. 5 is a sectional view showing an operation of a PCCI engine having a cooling nozzle 22, according to an embodiment of the present invention.

As shown in FIG. 5, the cooling nozzle 22 is connected to a cooling fluid storage tank 28 which contains a cooling fluid therein. A cooling fluid pump 30 is provided on the storage tank 28 to feed the cooling fluid from the storage tank 28 to the cooling nozzle 22 at a high pressure, so that the cooling fluid is injected into a combustion chamber 20 from the cooling nozzle 22. In the present invention, it is preferred to use water as the cooling fluid.

In the PCCI engine of the present invention, the cooling fluid pump 30 preferably feeds the cooling fluid from the storage tank 28 to the combustion chamber 20 during a compression stroke of the piston 40. To timely inject the cooling fluid into the combustion chamber 20, the PCCI engine of the present invention preferably has both a temperature sensor (not shown) in the combustion chamber 20 and a controller (not shown) to control the engine according to a sensed temperature of the combustion chamber 20. When the temperature in the combustion chamber 20 sensed by the temperature sensor (not shown) is not lower than a predetermined reference point (for example, a point lower than a natural ignition point of the premixed charge by 10° C.), the controller (not shown) controls the PCCI engine so that the cooling nozzle 22 injects the cooling fluid into the combustion chamber 20.

Therefore, during the compression stroke of the piston 40, the temperature of the high temperature and high pressure premixed charge in the combustion chamber 20 is reduced by the water which is injected under a high pressure. Thus, even though the piston 40 further compresses the premixed charge in the combustion chamber 20, there does not occur an-undesired natural ignition of the premixed charge in the combustion chamber 20.

In the operation of the PCCI engine of the present invention, the piston 40 passes the point A, which corresponds to the upper dead point of the conventional PCCI engine, and reaches the higher point B while compressing the premixed charge in the combustion chamber 20. In other words, the water injected from the cooling nozzle 22 into the combustion chamber 20 reduces the temperature in the chamber 20, so that the pressure of the chamber 20 increases. Thus, the piston 40 in the cylinder compresses the premixed charge in the combustion chamber 20 at a higher compression ratio. The compression ratio is an important variable that determines the engine efficiency. As the compression ratio increases, the engine efficiency is improved. The PCCI engine of the present invention accomplishes a compression ratio of about 30.

The PCCI engine of the present invention is provided with an electric igniter 24 in the combustion chamber 20 to ignite the premixed charge when the temperature of the combustion chamber 20 is excessively reduced. In the present invention, a conventional electric igniter may be preferably used as the electric igniter 24. When the temperature of the combustion chamber 20 is substantially low such that it is almost impossible to induce a natural ignition of the premixed charge during, for example, the winter season, it is preferred to initially ignite the premixed charge by the electric igniter 24. When the temperature of the combustion chamber 20 increases to a desired point after the electric ignition, the premixed charge is naturally ignited.

Figure 6:
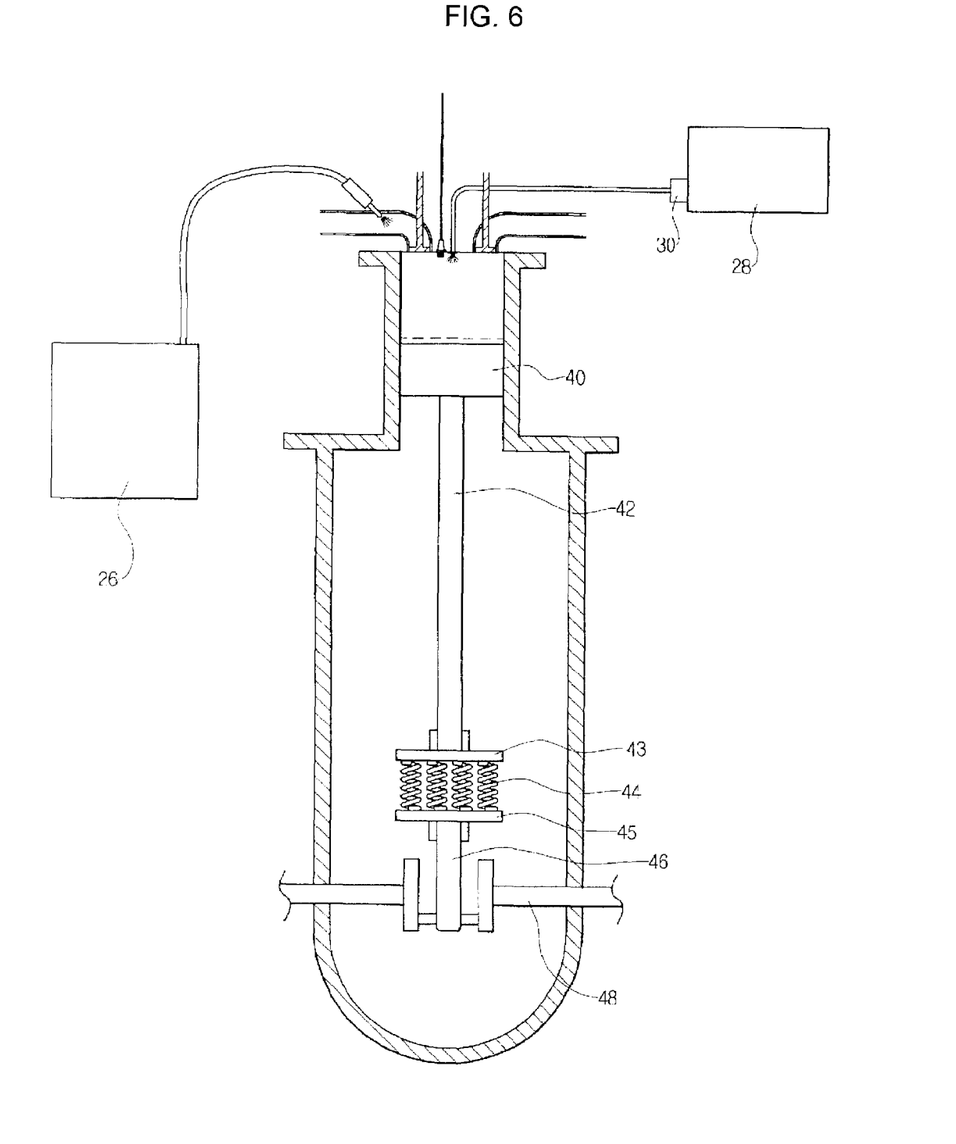
FIG. 6 is a sectional view showing a PCCI engine provided with first and second support plates and a plurality of springs as well as the cooling nozzle, according to another embodiment of the present invention.

FIG. 6 is a view showing a structurally improved connecting rod which has a plurality of springs 44 and is used in the PCCI engine of the present invention.

The connecting rod of the present invention is divided into first and second connecting rod parts 42 and 46 which are coupled to each other by first and second support plates 43 and 45 and the plurality of springs 44. The first connecting rod part 42 is coupled at both ends thereof to both the piston 40 and the first support plate 43, respectively. The plurality of springs 44 are interposed between the first and second support plates 43 and 45, thus supporting and coupling the first and second support plates 43 and 45 to each other.

The second support plate 45 is coupled to a first end of the second connecting rod part 46. The second connecting rod part 46 is also coupled at a second end thereof to a crankshaft 48 which converts a reciprocating motion of the piston 40 into a rotating motion.

During an operation of the PCCI engine having the above-mentioned connecting rod, the premixed charge of fuel and air is introduced into the combustion chamber 20 and the piston 40 executes a compression stroke in which the piston 40 moves upward in the cylinder to the upper dead point while compressing the premixed charge. During the compression stroke of the piston 40, the cooling fluid is injected into the combustion chamber 20 from the cooling nozzle 22, thus reducing the temperature of the chamber 20. Due to the reduction in the temperature of the combustion chamber 20, the piston 40 can further compress the premixed charge to induce a natural ignition of the premixed charge in the combustion chamber 20.

When the premixed charge is naturally ignited at a time the piston 40 reaches a position around the upper dead point, the piston 40 is thrust downward while the crankshaft 48 continuously rotates upward. In the above state, impacts applied from both the piston 40 and the crankshaft 48 are absorbed by the first and second support plates 43 and 45, while the kinetic energy of the impacts is stored as a restoring force in the elastic springs 44. Therefore, the piston 40 freely and flexibly moves in the cylinder at a position around the upper dead point.

When the crankshaft 48 starts to rotate downward to correspond to a downward movement of the piston 40, the springs 44 elastically pushes the crankshaft 44 by the restoring force. Therefore, the connecting rod of the present invention having the first and second support plates 43 and 45 and the plurality of springs 44 does not lose energy, but reuses the energy.

The piston 40 which can freely and flexibly move in the cylinder at a position around the upper dead point is so-called a 'free piston' in the related art.

Figure 7:
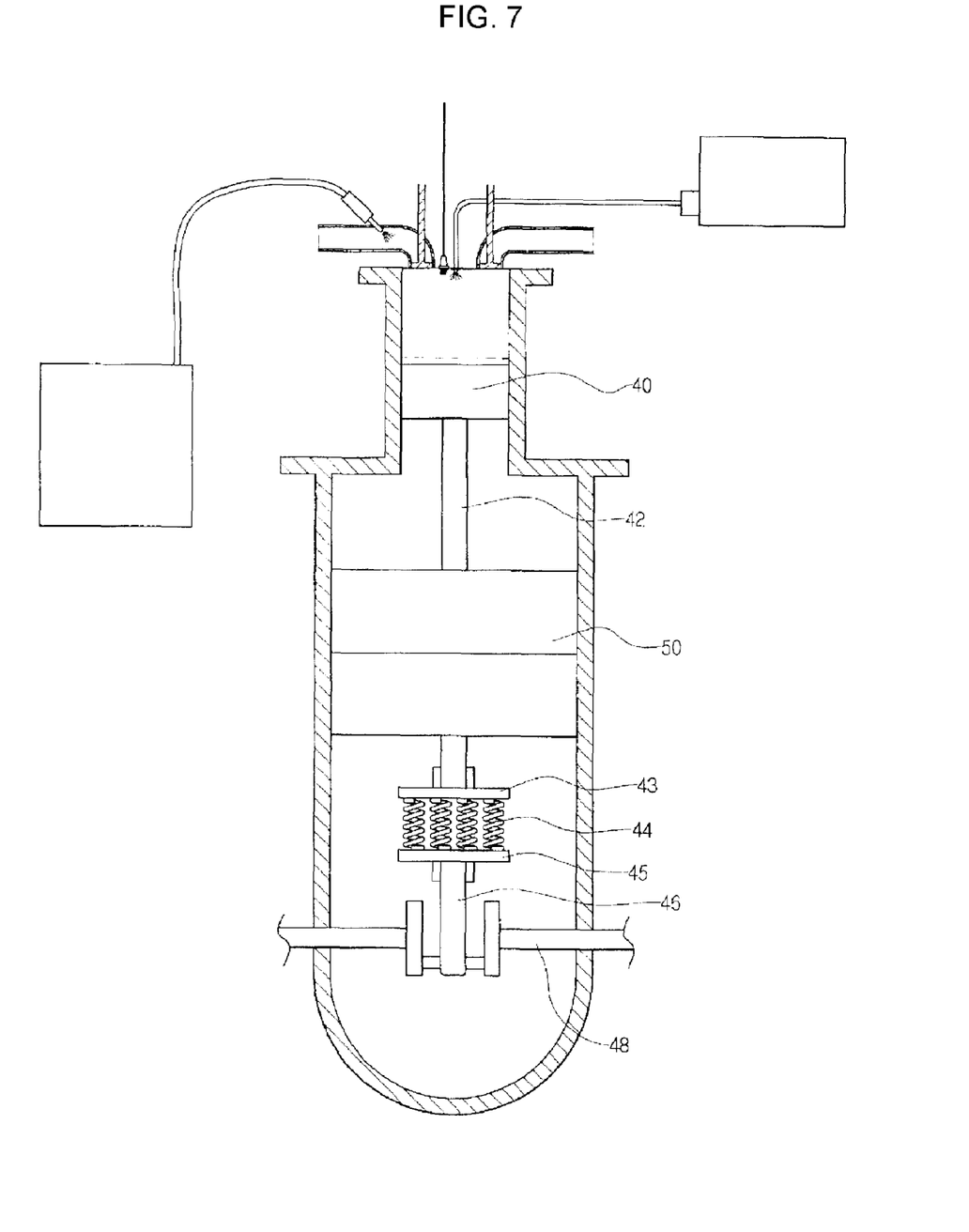
FIG. 7 is a PCCI reciprocating generator fabricated by a combination of a reciprocating generator unit with the PCCI engine of FIG. 6, according to a further embodiment of the present invention.

FIG. 7 is a PCCI reciprocating generator fabricated by a combination of a reciprocating generator unit 50 with the PCCI engine of the present invention to generate electricity, according to another embodiment of the present invention.

The reciprocating generator unit 50 installed in the PCCI reciprocating generator of FIG. 7 converts the reciprocating motion of the piston 40 of the PCCI engine into electricity. An example of the reciprocating generator unit 50 is referred to Korean Patent Application No. 2001-0012409.

The reciprocating generator unit 50 comprises a mover (not shown) which generates a magnetic force, and a stator (not shown) which has a coil to operate in conjunction with the mover and thereby generates electricity. The mover comprises a plurality of magnets (not shown) to generate the magnetic force. The plurality of magnets of the mover are provided with field windings to provide an electromagnetic force which generates a magnetic flux to increase the voltage of the generated electricity. The field windings of the mover are connected to field winding terminals through which external electricity is applied to the field windings from an external power source.

The reciprocating generator unit 50 of the PCCI reciprocating generator is coupled to the piston 40 via the first connecting rod part 42.

Different from a conventional arrangement in which a piston, a crankshaft and a rotary type generator unit are sequentially arranged, the present invention provides an arrangement in which the piston 40, the reciprocating generator unit 50 and the crankshaft 48 are sequentially arranged. The conventional arrangement is problematic in that a part of the reciprocating motion of the piston may be lost at the crankshaft before the reciprocating motion is transmitted to the rotary type generator unit. Thus, the conventional arrangement causes energy loss.

However, in the arrangement of the present invention in which the piston 40, the reciprocating generator unit 50 and the crankshaft 48 are sequentially arranged, the reciprocating motion of the piston 40 is primarily transmitted to the reciprocating generator unit 50. Thus, the present arrangement preferably reduces energy loss by about 2%.

The piston 40 of the PCCI reciprocating generator is coupled to the mover (not shown) through the first connecting rod part 42. At the lower end of the reciprocating generator unit 50, the mover (not shown) of the generator unit 50 may be directly coupled to the second connecting rod part 46.

Furthermore, the mover (not shown) of the reciprocating generator unit 50 may be coupled to the first support plate 43, while the crankshaft 48 may be coupled to the second connecting rod part 46 which is in turn coupled to the second support plate 45, as shown in FIG. 7. In the above state, the first and second support plates 43 and 45 are preferably supported and coupled by the plurality of springs 44.

The operation of the PCCI reciprocating generator remains the same as that described for the PCCI engine of the present invention, except for the operation of the reciprocating generator unit 50 which is interposed between the piston 40 and the crankshaft 48.

When supply of electricity for the reciprocating generator unit 50 of the PCCI reciprocating generator according to the present invention is stopped, the generator unit 50 is free from any load, thus allowing a user to selectively use the PCCI reciprocating generator as a PCCI engine or a PCCI generator while controlling the supply of electricity for the generator unit 50. In other words, when electricity is applied to the generator unit 50, the PCCI reciprocating generator is used as the PCCI generator to generate electricity. However, when any electricity is not applied to the generator unit 50, the PCCI reciprocating generator is used as the PCCI engine to provide work using the rotating force of the crankshaft 48.

The stator (not shown) of the reciprocating generator unit 50 is mounted to an engine casing, thus supporting the reciprocating generator unit 50.

Figure 8:
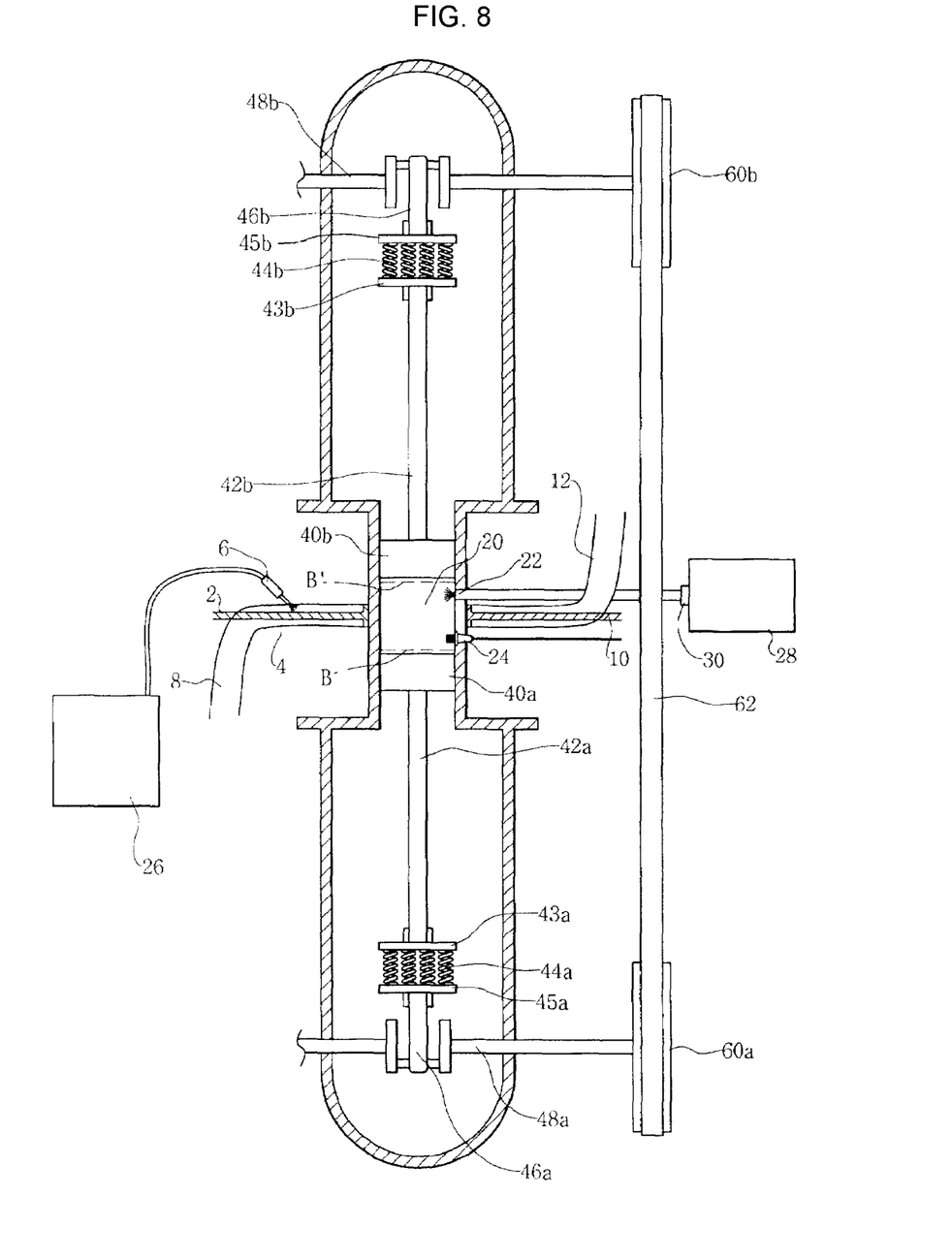
FIG. 8 is a multiple PCCI engine fabricated by a combination of two PCCI engines of FIG. 6 such that the two PCCI engines are arranged to face each other, according to a further embodiment of the present invention.

FIG. 8 is a multiple PCCI engine fabricated by a combination of two PCCI engines of FIG. 6 such that the two PCCI engines are arranged to face each other, according to a further embodiment of the present invention.

As shown in FIG. 8, in the multiple PCCI engine according to the further embodiment of the present invention, a suction port 4, an exhaust port 12, a cooling nozzle 22 and an electric igniter 24 are provided on a sidewall of a combustion chamber 20, different from the embodiments of FIGS. 5 through 7. In the present invention, it is preferred to install the suction port 4, the exhaust port 12, the cooling nozzle 22 and the electric igniter 24 are provided on the sidewall of the combustion chamber 20 at positions between the upper dead points B and B' of first and second pistons 40a and 40b.

The first and second pistons 40a and 40b are respectively arranged in the lower and upper parts in the combustion chamber 20 to face each other, so that the first and second pistons 40a and 40b reciprocate in opposite directions based on the combustion chamber 20.

In a detailed description, the first piston 40a is coupled to a first crankshaft 48a via a first connecting rod part 42a, a first support plate 43a, a plurality of first springs 44a, a second support plate 45a, and a second connecting rod part 46a, in the same manner as that described for the embodiment of FIG. 6. Similarly, the second piston 40b is coupled to a second crankshaft 48b via a third connecting rod part 42b, a third support plate 43b, a plurality of second springs 44b, a fourth support plate 45b, and a fourth connecting rod part 46b.

In the multiple PCCI engine of the present invention, it is necessary to construct the engine so that the first and second pistons 40a and 40b can reciprocate in the cylinder in the opposite directions based on the combustion chamber 20 with a desired precision. In other words, the multiple PCCI engine must be constructed so that the first and second pistons 40a and 40b synchronously execute the suction strokes, the compression strokes, the explosion strokes and the exhaust strokes thereof. To accomplish the above-mentioned object, the multiple PCCI engine of the present invention is provided with first and second pulleys 60a and 60b that are connected to each other by a belt 62.

That is, the first and second crankshafts 48a and 48b are respectively coupled to the first and second pulleys 60a and 60b around which the belt 62 is wrapped. Thus, the first and second pistons 40a and 40b reciprocate in the cylinder in the opposite directions based on the combustion chamber 20 with the desired precision.

Because the first and second pistons 40a and 40b reciprocate in the cylinder in the opposite directions based on the combustion chamber 20 with the desired precision, it is possible to reduce vibration during the operation of the PCCI engine. Furthermore, the multiple PCCI engine of the present invention does not require any cylinder head thus reducing the heat transfer area of the engine to reduce heat loss.

In the same manner as that described for the embodiments of FIGS. 5 through 7, the multiple PCCI engine of the present invention comprises a suction valve 2 in the suction port 4, and an exhaust valve 10 in the exhaust port 12. A suction manifold 8 having an injector 6 is coupled to the suction port 4. Furthermore, the cooling nozzle 22 is connected through a pipe to a cooling fluid storage tank 28 which contains therein the cooling fluid. A cooling fluid pump 30 is provided on the storage tank 28 to feed the cooling fluid from the storage tank 28 to the cooling nozzle 22 at a high pressure, so that the cooling fluid is injected into the combustion chamber 20 from the cooling nozzle 22. In the multiple PCCI engine, it is preferred to use water as the cooling fluid.

In the multiple PCCI engine, the cooling fluid pump 30 is preferably operated to inject the cooling fluid into the combustion chamber 20 during the compression strokes of the first and second pistons 40a and 40b. To accomplish the above-mentioned object, the multiple PCCI engine preferably has both a temperature sensor (not shown) in the combustion chamber 20 and a controller (not shown) to control the engine according to a sensed temperature of the combustion chamber 20. When the temperature in the combustion chamber 20 sensed by the temperature sensor (not shown) is not lower than a predetermined reference point, the controller (not shown) controls the multiple PCCI engine so that the cooling nozzle 22 injects the cooling fluid into the combustion chamber 20.

Therefore, during the compression strokes of the first and second pistons 40a and 40b, the temperature of the high temperature and high pressure premixed charge in the combustion chamber 20 is reduced by the water which is injected into the combustion chamber 20 under a high pressure. Thus, even though the first and second pistons 40a and 40b further compress the premixed charge in the combustion chamber 20, there does not occur an undesired natural ignition of the premixed charge in the combustion chamber 20.

Therefore, the multiple PCCI engine of the present invention increases the compression ratio to improve the engine efficiency.

Figure 9:
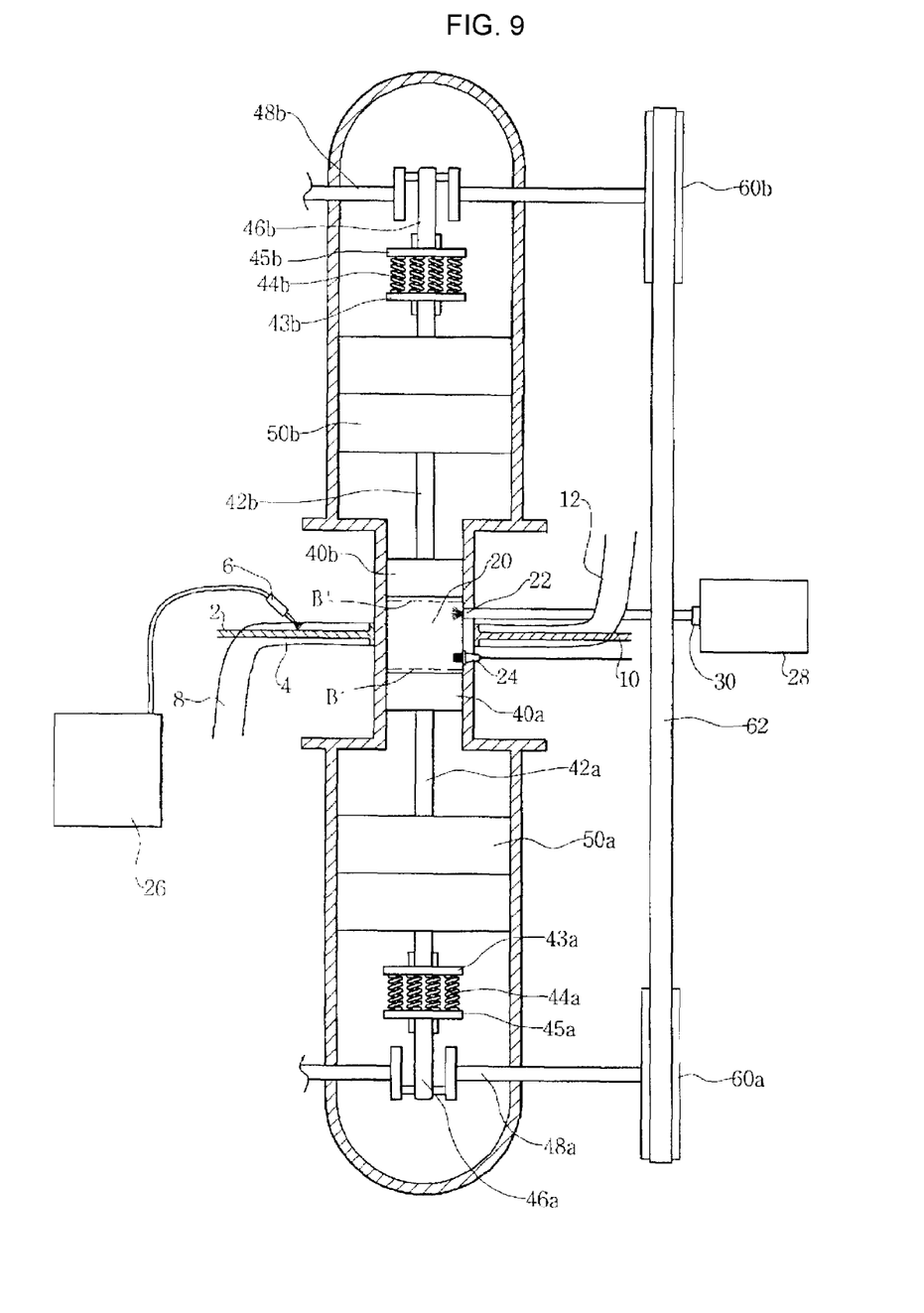
FIG. 9 is a sectional view of a multiple PCCI reciprocating generator fabricated by a combination of reciprocating generator units with the multiple PCCI engine of FIG. 8, according to a further embodiment of the present invention.

FIG. 9 is a sectional view of a multiple PCCI reciprocating generator fabricated by a combination of first and second reciprocating generator units 50a and 50b with the multiple PCCI engine of FIG. 8, according to a further embodiment of the present invention.

The multiple PCCI reciprocating generator according to the further embodiment of the present invention is constructed as follows.

In the multiple PCCI reciprocating generator, the mover (not shown) of the first reciprocating generator unit 50a is coupled at a first end thereof to a first connecting rod part 42a, and at a second end thereof to a second connecting rod part 46a through a first support plate 43a, a plurality of first springs 44a and a second support plate 45a. In the same manner, the mover (not shown) of the second reciprocating generator unit 50b is coupled at a first end thereof to a third connecting rod part 42b, and at a second end thereof to a fourth connecting rod part 46b through a third support plate 43b, a plurality of second springs 44b and a fourth support plate 45b.

Furthermore, the stators (not shown) of the first and second reciprocating generator units 50a and 50b are mounted to an engine casing, thus supporting the reciprocating generator units 50a and 50b.

The operation of the multiple PCCI reciprocating generator remains the same as that described for the multiple PCCI engine of FIG. 8, except for the operation of the first and second reciprocating generator units each of which is interposed between a piston and a crankshaft.

As described above, the PCCI engine of the present invention has a cooling nozzle to inject a cooling fluid to a hot premixed charge of fuel and air in a combustion chamber, thus retarding a natural ignition of the premixed charge and accomplishing a higher compression ratio, and thereby improving the engine efficiency.

The PCCI engine of the present invention has a structurally improved connecting rod with a plurality of springs. Thus, the compressive energy generated by the opposite directional movements of the piston and the crankshaft when a piston reaches a position around the upper dead point is stored as a restoring force in the springs. The restoring force of the springs is, thereafter, used to push the crankshaft when both the piston and the crankshaft move in the same direction. Thus, the connecting rod having the springs reduces energy loss of the PCCI engine.

The present invention further provides a multiple PCCI engine in which two PCCI engines are arranged to symmetrically face each other. Thus, the multiple PCCI engine minimizes vibration during the reciprocating motions of two pistons of the two PCCI engines. Because the multiple PCCI engine does not require any cylinder head it is possible to reduce heat loss by a reduction in the heat transfer area of the multiple PCCI engine.

The present invention further provides a PCCI reciprocating generator that is fabricated by a combination of a reciprocating generator unit with the PCCI engine, thus improving the electricity generating efficiency of the reciprocating generator.

In the PCCI reciprocating generator of the present invention, the reciprocating generator unit is coupled to the piston of the PCCI engine with a crankshaft installed in back of the reciprocating generator unit, thus reducing energy loss at the crankshaft.

The PCCI reciprocating generator of the present invention can be selectively used as a PCCI engine or a reciprocating generator as desired.

INDUSTRIAL APPLICABILITY

As described above, the present invention provides a PCCI engine which is provided with an injector in a suction manifold to inject fuel to inlet air, thus preparing a premixed charge of fuel and air in the suction manifold and in which the premixed charge is naturally ignited in a high temperature and high pressure combustion chamber without any separate electric igniter. The present invention further provides a PCCI reciprocating generator fabricated by a combination of a reciprocating generator unit with the PCCI engine.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A premixed charge compression ignition (PCCI) engine to compress a premixed charge of fuel and air at a high temperature and a high pressure, and thus, induce a natural ignition of the premixed charge, the PCCI engine comprising:
   a suction port provided with a suction valve;
   an exhaust port provided with an exhaust valve;
   a suction manifold placed to communicate with the suction port, and provided with an injector, thus homogeneously mixing the fuel with the air therein to provide the premixed charge;
   a cooling nozzle provided at an upper end in a combustion chamber of a cylinder;
   a fluid feed pump to feed a cooling fluid to the cooling nozzle at a high pressure;

a storage tank to store the cooling fluid therein, wherein the cooling nozzle injects the cooling fluid into the combustion chamber at a high pressure during a compression stroke of a piston in the cylinder, thus providing a high compression ratio to induce the natural ignition of the premixed charge;

a first connecting rod part coupled at both ends thereof to the piston and a first support plate, respectively;

a second connecting rod part coupled at both ends thereof to a crankshaft and a second support plate, respectively; and a plurality of springs to support and couple the first and second support plates to each other.

2. The PCCI engine according to claim 1, further comprising:

an electric igniter provided at an upper portion of the combustion chamber.

3. A premixed charge compression ignition (PCCI) reciprocating generator having a PCCI engine structure to compress a premixed charge of fuel and air at a high temperature and a high pressure, and thus, induce a natural ignition of the premixed charge, the PCCI reciprocating generator comprising:

a suction port provided with a suction valve;

an exhaust port provided with an exhaust valve; a suction manifold placed to communicate with the suction port and provided with an injector, thus homogeneously mixing the fuel with the air therein to provide the premixed charge;

a cooling nozzle provided at an upper end in a combustion chamber of a cylinder;

a fluid feed pump to feed a cooling fluid to the cooling nozzle at a high pressure;

a storage tank to store the cooling fluid therein, so that the cooling nozzle injects the cooling fluid into the combustion chamber at a high pressure during a compression stroke of a piston in the cylinder, thus providing a high compression ratio to induce the natural ignition of the premixed charge;

a reciprocating generator unit to generate electricity using a reciprocating force of the piston, wherein the reciprocating generator unit is coupled at a first end thereof to a first connecting rod part which is coupled to the piston, and at a second end thereof to a second connecting rod part which is coupled to a crankshaft, so that work of the piston is transmitted to the reciprocating generator unit without being reduced by the crankshaft;

a first support plate coupled to the reciprocating generator unit at a position between the reciprocating generator unit and the second connecting rod part;

a second support plate coupled to the second connecting rod part at a position between the reciprocating generator unit and the second connecting rod part; and a plurality of springs to support and couple the first and second support plates to each other.

4. The PCCI reciprocating generator according to claim 3, further comprising:

an electric igniter provided at an upper portion of the combustion chamber.

5. A premixed charge compression ignition (PCCI) engine to compress a premixed charge of fuel and air at a high temperature and a high pressure, and thus, induce a natural ignition of the premixed charge, the PCCI engine comprising:

a combustion chamber provided at a sidewall thereof with both a suction port having a suction valve and an exhaust port having an exhaust valve;

a suction manifold coupled to the suction port and having an injector therein;

first and second pistons respectively arranged in lower and upper parts in the combustion chamber to face each other, so that the first and second pistons reciprocate in opposite directions based on the combustion chamber;

first and second crankshafts respectively coupled to the first and second pistons through a mechanical manner;

first and second pulleys respectively coupled to the first and second crankshafts;

a belt wrapped around the first and second pulleys to allow the first and second pistons to reciprocate in the opposite directions based on the combustion chamber;

a first connecting rod part coupled at both ends thereof to the first piston and a first support plate, respectively;

a second connecting rod part coupled at both ends thereof to the first crankshaft and a second support plate, respectively;

a plurality of first springs to support and couple the first and second support plates to each other;

a third connecting rod part coupled at both ends thereof to the second piston and a third support plate, respectively;

a fourth connecting rod part coupled at both ends thereof to the second crankshaft and a fourth support plate, respectively; and a plurality of second springs to support and couple the third and fourth support plates to each other.

6. The PCCI engine according to claim 5, further comprising:

a cooling nozzle provided on the sidewall of the combustion chamber;

a fluid feed pump to feed a cooling fluid to the cooling nozzle at a high pressure;

a storage tank to store the cooling fluid therein; a temperature sensor to sense a temperature of the combustion chamber; and a controller to control the engine so that the cooling nozzle injects the cooling fluid into the combustion chamber when the temperature of the combustion chamber sensed by the temperature sensor is not lower than a predetermined reference point.

7. The PCCI engine according to claim 5, further comprising:

an electric igniter provided on the sidewall of the combustion chamber.

8. A premixed charge compression ignition (PCCI) reciprocating generator having a PCCI engine structure to compress a premixed charge of fuel and air at a high temperature and a high pressure, and thus, induce a natural ignition of the premixed charge, the PCCI reciprocating generator comprising:

a combustion chamber provided at a sidewall thereof with both a suction port having a suction valve and an exhaust port having an exhaust valve;

a suction manifold coupled to the suction port and having an injector therein;

first and second pistons respectively arranged in lower and upper parts in the combustion chamber to face each other, so that the first and second pistons reciprocate in opposite directions based on the combustion chamber;

first and second reciprocating generator units to generate electricity using reciprocating forces of the first and second pistons, respectively, wherein the first reciprocating generator unit is coupled at a first end thereof to a first connecting rod part which is coupled to the first piston, and at a second end thereof to a second connecting rod part which is coupled to the first crankshaft, and the second reciprocating generator unit is coupled at a first end thereof to a third connecting rod part which is coupled to the second piston, and at a second end thereof to a fourth connecting rod part which is coupled to the second crankshaft;
a first support plate coupled to the second end of the first reciprocating generator unit;
a second support plate coupled to the second connecting rod part;
a plurality of first springs to support and couple the first and second support plates to each other;
a third support plate coupled to the second end of the second reciprocating generator unit;
a fourth support plate coupled to the fourth connecting rod part; and
a plurality of second springs to support and couple the third and fourth support plates to each other.

9. The PCCI reciprocating generator according to claim 8, further comprising:
a cooling nozzle provided on the sidewall of the combustion chamber;
a fluid feed pump to feed a cooling fluid to the cooling nozzle at a high pressure;
a storage tank to store the cooling fluid therein;
a temperature sensor to sense a temperature of the combustion chamber; and
a controller to control the generator so that the cooling nozzle injects the cooling fluid into the combustion chamber when the temperature of the combustion chamber sensed by the temperature sensor is not lower than a predetermined reference point.

10. The PCCI reciprocating generator according to claim 8, further comprising:
first and second crankshafts respectively coupled to the first and second pistons through a mechanical manner;
first and second pulleys respectively coupled to the first and second crankshafts; and
a belt wrapped around the first and second pulleys to allow the first and second pistons to reciprocate in the opposite directions based on the combustion chamber.

11. The PCCI reciprocating generator according to claim 8, further comprising:
an electric igniter provided on the sidewall of the combustion chamber.

* * * * *